Patented Oct. 8, 1929

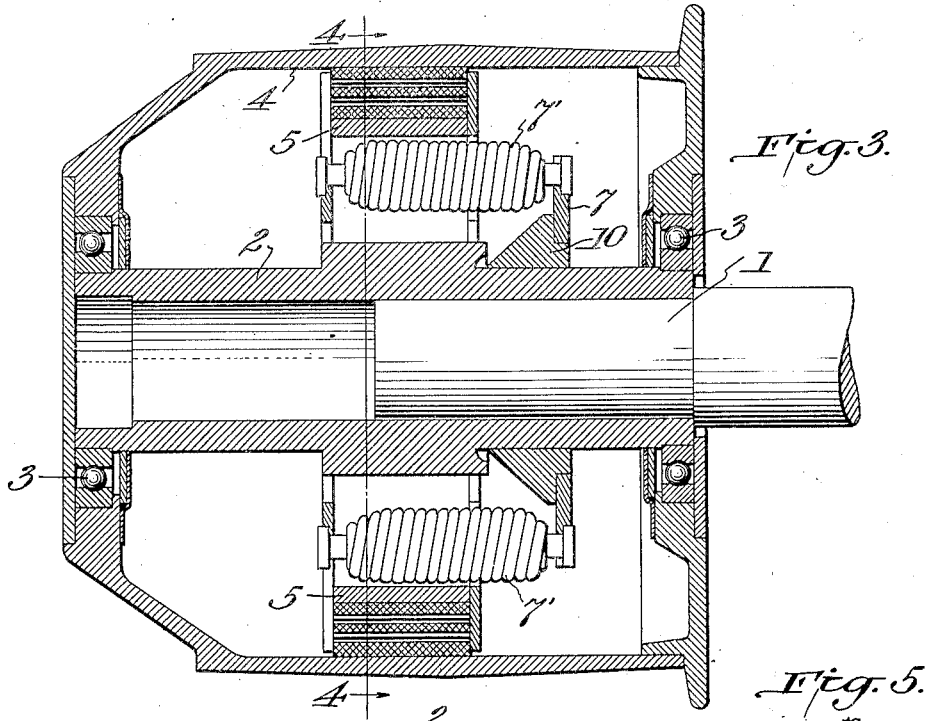
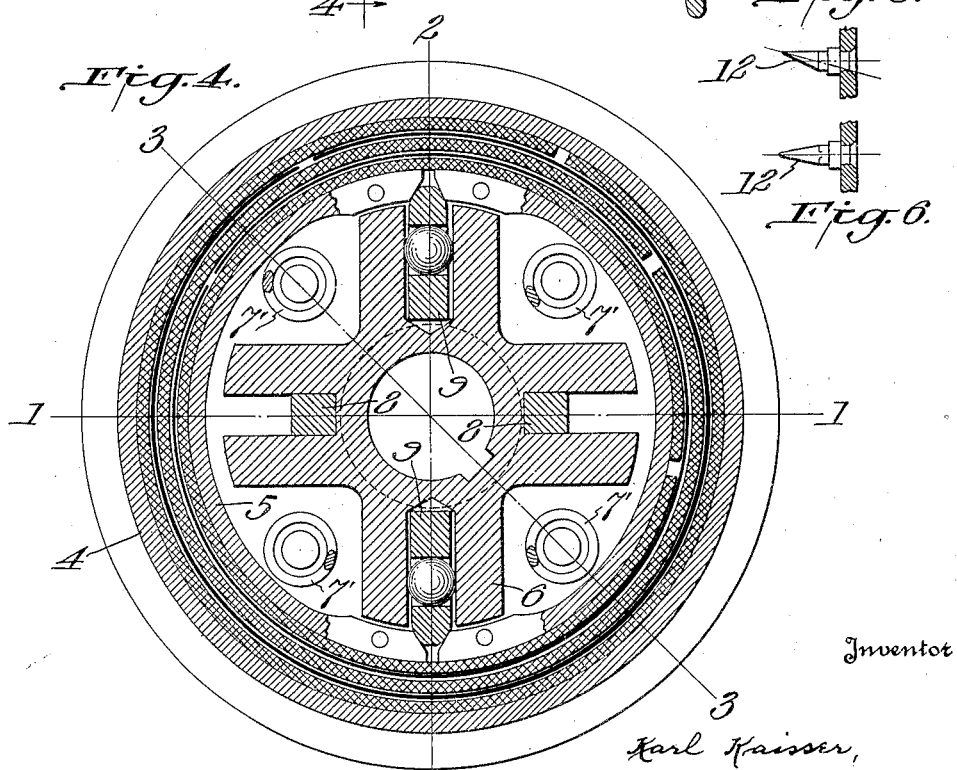

1,730,937

UNITED STATES PATENT OFFICE

KARL KAISSER, OF MUNICH, GERMANY, ASSIGNOR TO METALLGESELLSCHAFT AKTIENGESELLSCHAFT, OF FRANKFORT-ON-THE-MAIN, GERMANY, A CORPORATION OF GERMANY

CENTRIFUGAL FRICTION CLUTCH

Application filed November 21, 1927, Serial No. 234,806, and in Germany January 27, 1927.

This invention relates to a centrifugal friction clutch with two pairs or groups of centrifugal members, such as centrifugal levers. The one group of said levers tends to expand (against the action of a counter force) a clutch ring coupling the driving member of the clutch with the driven member, as soon as the driving member—mounted, for example, on the shaft of an electromotor—has attained the necessary speed for taking up the load. The duty of the other group of levers is to relieve the coupling centrifugal levers from the influence of the counter force when the clutch is in engagement.

The invention provides that the counter force is thrown out of action, in the first place, by means of its allotted group of levers, before the centrifugal levers acting on the clutch ring are free and can throw-in the clutch.

The advantage of this method of operation is that it ensures the regular succession of the phases coming into operation after the driving member has attained its full speed. This successive action of the centrifugal levers is of particular advantage when the neutralizing of the counter-force retarding the coupling levers is intended to control or release a device which—in the event of the clutch being employed in starting an electromotor, and especially motors with short-circuited rotors—has to effect the cutting out of a series resistance as soon as the rotor has attained its maximum speed and before it begins to take up the load. In this case the friction clutch of the present invention may be so arranged that the device for cutting out the resistance is brought into action before the release of the coupling levers, the clutch not being thrown-in until afterwards, so that the supply of full current to the motor does not coincide with the engagement of the clutch.

Figure 1:
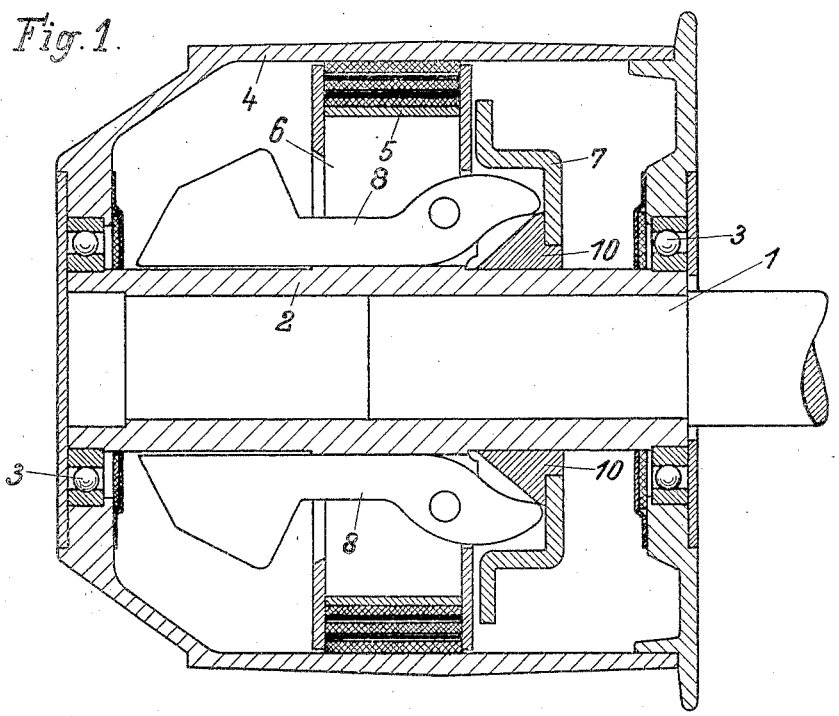
Figure 2:
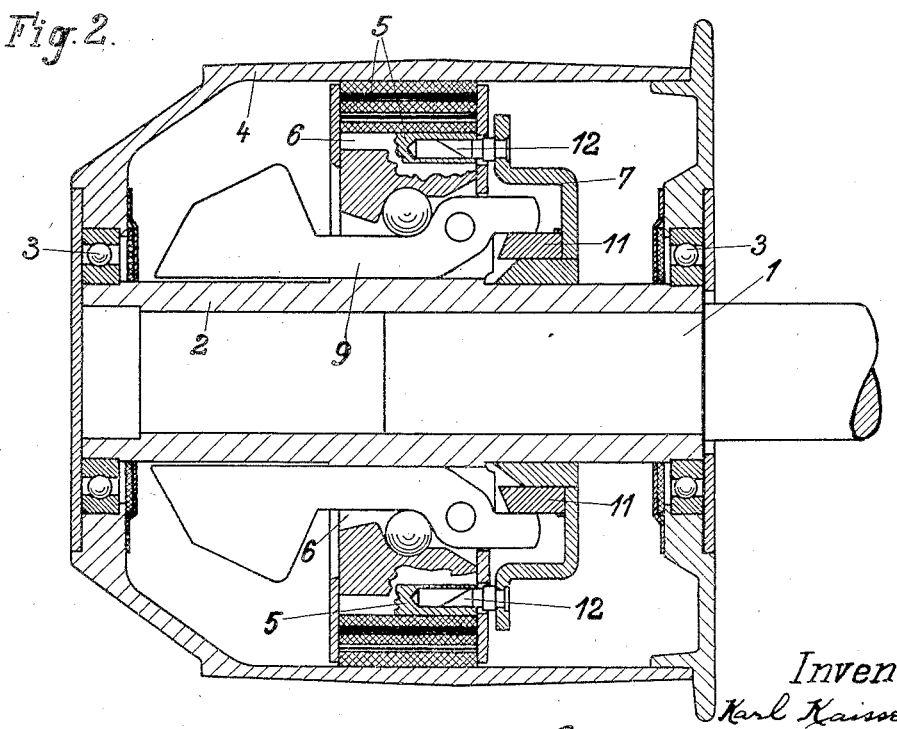

In order more clearly to understand the invention, reference is made to the accompanying drawing which illustrates by way of example, a typical embodiment thereof, and in which:

Fig. 1 is a horizontal section of the clutch on line 1—1 of Fig. 4,

Fig. 2 is a sectional view taken at right angles to Fig. 1, on line 2—2 of Fig. 4, Fig. 3 is a section on line 3—3 of Fig. 4, Fig. 4 is a section on line 4—4 of Fig. 3, Fig. 5 is a side elevation of one locking pin, and Fig. 6 is a plan view thereof.

The hub 2 of the clutch is mounted on the driving shaft 1. The idle member 4 of the clutch, which is in the form of a belt pulley, runs on ball bearings 3 on said hub 2, the member 4 being carried around by the expanding ring 5, which is guided in a spider 6 of the hub 2 and is preferably composed of several layers. A collar 7 is mounted on the hub 2 so as to be displaceable in an axial direction against the action of one or more springs 7'. The spider 6 carries two pairs 8 and 9 of pivotally mounted, two-arm centrifugal levers. The pair of levers 8 acts, by means of the arm remote from the weighted end, against an oblique surface 10 on the collar 7, whereas the function of the levers 9 is to bring the expansion ring, on expansion, to bear against the driven member 4 of the clutch when said levers diverge. On the side facing the unweighted ends of the levers 9, the collar 7 is provided with noses 11 which normally (Fig. 2) engage under the lever arms 9.

The clutch operates in the following manner:—

When the shaft 1 begins to turn, carrying round with it the hub 2, the spider 6 and the centrifugal levers pivoted thereon, the levers 8 tend to fly outwards under the influence of centrifugal force, but are prevented from so doing by the contact between their inner arms and the oblique surface 10 of the collar, and by the action of the springs 7' on said collar, until the driving shaft has attained its full speed. At this point the centrifugal force of the levers 8 is sufficient to force the collar outwardly.

When the collar 7 has traversed about three-fourths of its stroke, the levers 9 disengage from the noses 11, their weighted arms swinging outwards and pressing the expanding ring 5 firmly against the clutch member 4, thus bringing the clutch fully into operation. The sole function of the final quarter of the stroke of the collar is to ensure that there is no back pressure of the collar against the levers 9, the latter being kept free.

The displacement of the collar 7 will have previously drawn the pointed locking pins 12, which it carries, so far out of the expanding ring 5 that the latter can begin to expand under the influence of the centrifugal force; and thus prepare for its subsequent final firm grip (by means of the levers 9).

As the speed of shaft 1 is increased, release of the blocking collar 7 by the levers 8, initial expansion of the ring 5 on withdrawal of the pins 12 (a kind of pre-clutching), release of the levers 9 and consequent firm engagement of the expanding ring with the clutch member 4 (clutching-in) occur in sequence.

Although the pins 12 release the ring 5 for expanding, their tapered form causes them to remain in loose connection therewith, so that the ring will with certainty be re-engaged by the pins when the clutch becomes disconnected.

The reverse arrangement may be adopted of mounting the pins on the expanding ring and providing the sockets therefor in the collar 7.

It will be understood that the invention is not limited to particular shape of the centrifugal levers as shown, since other forms may be used to swing outwardly under the action of the centrifugal force without departing from the spirit and scope of the invention, the essential feature of which is that the members which neutralize the counter force acting on the clutch members, should come into action prior to the clutch members themselves.

What I claim is:—

1. In a centrifugal clutch, a driving member, a driven member, centrifugal clutching members on said driving member, a ring adapted to be expanded by said centrifugal clutching members into engagement with said driven member, an axially displaceable collar on said driving member, means for preventing by said collar expansion of said ring, and centrifugal members on said driving member displacing said collar and releasing said expansion-preventing means.

2. In a centrifugal clutch, a driving member, a driven member, centrifugal clutching members on said driving member, a ring adapted to be expanded by said centrifugal clutching members into engagement with said driven member, an axially displaceable collar on said driving member, means for preventing by said collar expansion of said ring and constantly maintaining said collar and said ring in mutual cooperation, and centrifugal members on said driving member displacing said collar and releasing said expansion-preventing means.

3. In a centrifugal clutch, a driving member, a driven member, centrifugal clutching members on said driving member, a ring adapted to be expanded by said centrifugal clutching members into engagement with said driven member, an axially displaceable collar on said driving member, pointed pins interengaging said ring and said collar, and centrifugal members on said driving member for displacing said collar and disconnecting said pins from expansion-preventing interengagement of said ring and said collar.

4. In a clutch device, a driving member, a driven member, centrifugally-operated elements carried by said driving member for connecting the said members, axially movable means preventing movement of said elements into clutch-engaging position, and centrifugally operated means carried by the driving member for moving said axially movable means to release said centrifugally operated elements when the driving member reaches a predetermined speed.

In testimony whereof I affix my signature.

KARL KAISSER.